United States Patent
Yates et al.

(10) Patent No.: US 10,222,460 B2
(45) Date of Patent: *Mar. 5, 2019

(54) DEVICE AND METHOD FOR MEASURING DISTANCE VALUES AND DISTANCE IMAGES

(71) Applicant: odos imaging Ltd., Edinburgh (GB)

(72) Inventors: Chris Yates, Edinburgh (GB); Chris Softley, Gorebridge (GB)

(73) Assignee: ODOS IMAGING LTD., Edinburgh (GB)

(*) Notice: Subject to any disclaimer, the term of this patent is extended or adjusted under 35 U.S.C. 154(b) by 0 days.

This patent is subject to a terminal disclaimer.

(21) Appl. No.: 15/896,680

(22) Filed: Feb. 14, 2018

(65) Prior Publication Data

US 2018/0239002 A1    Aug. 23, 2018

Related U.S. Application Data

(63) Continuation of application No. 14/704,090, filed on May 5, 2015, now Pat. No. 9,897,691, which is a
(Continued)

(30) Foreign Application Priority Data

Nov. 5, 2012    (DE) .................. 10 2012 110 538

(51) Int. Cl.
*G01C 3/08*     (2006.01)
*G01S 7/486*    (2006.01)
(Continued)

(52) U.S. Cl.
CPC .......... *G01S 7/4866* (2013.01); *G01S 7/4863* (2013.01); *G01S 7/497* (2013.01); *G01S 17/08* (2013.01); *G01S 17/107* (2013.01)

(58) Field of Classification Search
CPC .................. G01S 7/4866; G01S 17/08
See application file for complete search history.

(56) References Cited

U.S. PATENT DOCUMENTS

| | | |
|---|---|---|
| 4,259,592 A | 3/1981 | Fruengel et al. |
| 6,778,219 B1 | 8/2004 | Seo et al. |
| 6,919,549 B2 | 7/2005 | Bamji et al. |

FOREIGN PATENT DOCUMENTS

| | | |
|---|---|---|
| CN | 102323594 A | 1/2012 |
| DE | 102007046562 A1 | 4/2009 |

(Continued)

OTHER PUBLICATIONS

International Search Report in counterpart International Application No. PCT/EP2013/072819, dated Jan. 31, 2014.
(Continued)

*Primary Examiner* — Samantha K Abraham
(74) *Attorney, Agent, or Firm* — Edell, Shapiro & Finnan, LLC

(57) ABSTRACT

A distance camera includes at least one photo element, a trigger generator activating the photo element during a temporal integration gate, a light source illuminating an object with light pulses having a predetermined temporal intensity profile with a duration $T_p$, and an intensity sensor determining the intensity $I_p$ of the light pulses arriving on the photo element. The integration gate has a predetermined delay to the light pulse emission start point in order to capture the light pulses back reflected from the object. The photo element outputs a signal value U at an integration end point in time $T_{1e}$ and in accordance with an intensity $I_p$ and a duration of the light pulse arriving on the photo element during its activation.

15 Claims, 3 Drawing Sheets

Related U.S. Application Data continuation of application No. PCT/EP2013/072819, filed on Oct. 31, 2013.

(60) Provisional application No. 61/722,465, filed on Nov. 5, 2012.

(51) Int. Cl.
*G01S 17/10* (2006.01)
*G01S 7/497* (2006.01)
*G01S 17/08* (2006.01)

(56) References Cited

FOREIGN PATENT DOCUMENTS

| | | | |
|---|---|---|---|
| JP | 2001-153624 A | 6/2001 | |
| JP | 2006-523074 A | 10/2006 | |
| WO | 0019705 A1 | 4/2000 | |
| WO | 2009105857 A1 | 9/2009 | |
| WO | WO-2009105857 A1 * | 9/2009 | ........... G01S 17/107 |

OTHER PUBLICATIONS

English translation of Office Action in corresponding Chinese Application No. 2013800576522.
Office Action in corresponding Japanese Patent Application No. 2015-540129, dated Apr. 24, 2017, with English translation.

* cited by examiner

DEVICE AND METHOD FOR MEASURING DISTANCE VALUES AND DISTANCE IMAGES

CROSS REFERENCE TO RELATED APPLICATIONS

This application is a Continuation of U.S. patent application Ser. No. 14/704,090, filed on May 5, 2015, which is a Continuation of International Application No. PCT/EP2013/072819, filed on Oct. 31, 2013, which claims benefit under 35 U.S.C. § 119(e) to U.S. Provisional Application No. 61/722,465, filed Nov. 5, 2012, and which claims priority under 35 U.S.C. § 119(a) to German Patent Application No. 10 2012 110 538.3, also filed on Nov. 5, 2012. The disclosures of all four related applications are considered part of and are incorporated by reference into the disclosure of the present application in their respective entireties.

FIELD AND BACKGROUND OF THE INVENTION

The invention relates to a device and a method for determining distance values and distance images.

Distance values can be measured between a measuring device and an object without a physical contact between the device and the object by optical methods. In these methods, the object is illuminated by the device and the light back reflected from the object is then captured by a light detector of the device.

Distance values can for example be determined by periodically modulating the light intensity which is emitted from the device and by measuring the phase difference between the emitted light and the back reflected light arriving on the detector. However, due to the periodicity of the light intensity this method results in an ambiguous distance measurement. Unambiguous distance values can be determined by measuring the time of flight between the emission of light and the arrival of the back reflected light on the detector.

For a time of flight measurement with a precision of the distance value in the order of centimeters fast electronics acting and responding in the picosecond range are required. The distance value measured by the device can therefore depend on manufacturing tolerances of the detector. If an image sensor with multiple picture elements is used for the detector, different picture elements can measure different distance values due to the manufacturing tolerances of the picture elements.

SUMMARY

It is an object of the invention to provide a device and a method for measuring distance values with a high precision.

A distance camera according to the invention for determining a distance value $R_{abs}$ between an object and the distance camera within a predetermined distance range comprises at least one photo element, a trigger generator for activating the photo element during a temporal integration gate, a light source for illuminating the object with light pulses having a predetermined temporal intensity profile with a duration $T_p$, and an intensity sensor for determining the intensity $I_p$ of the light pulses arriving on the photo element, wherein the integration gate has a predetermined delay to the light pulse emission start point in time in order to capture the light pulses back reflected from the object such that either $T_o$ or $T_o+T_p$ is between an integration start point in time $T_{1b}$ of the integration gate and an integration end point in time $T_{1e}$ of the integration gate, with $T_o$ being the first point in time when the light pulse arrives on the photo element, wherein the photo element is adapted to output a signal value U at the integration end point in time $T_{1e}$ with the signal value U depending on the intensity $I_p$ and the duration of the light pulse arriving on the photo element during its activation, wherein the camera comprises a memory unit for storing predetermined parameters of an explicit correction value function $\Delta = f(I_p)$ for the photo element, and an evaluation unit for determining a raw distance value $R_{raw}$ from the signal value U and the intensity $I_p$ and adding the raw distance value $R_{raw}$ and the correction value $\Delta(I_p)$ for obtaining the distance value $R_{abs}$.

The method according to the invention for determining the distance value $R_{abs}$ between the object and the distance camera comprises the steps: a) arranging a target object within the predetermined distance range with a predetermined distance $R_{abs,cal}$ to the distance camera; b) obtaining a plurality of sampling points $R_{raw,cal}$, $I_{p,cal}$ by:

illuminating the target object with the light source with variable and determined intensities $I_{p,cal}$ of the light pulses arriving on the photo element, and determining the respective raw distance values $R_{raw,cal}$ from the respective signal values $U_{cal}$ and the corresponding intensities $I_{p,cal}$; c) calculating the parameters of the explicit correction value function $\Delta = R_{raw,cal} - R_{abs,cal} = f(I_{p,cal})$ being an interpolation of the sampling points $R_{raw,cal}$, $I_{p,cal}$, and storing the parameters for the photo element in the memory unit; d) arranging the object within the predetermined distance range; e) illuminating the object with the light source with the light pulse, and determining the raw distance value $R_{raw}$ from the signal value U and the corresponding intensity $I_p$ determined using the intensity sensor; f) calculating the correction value $\Delta(I_p)$ for the raw distance value $R_{raw}$ in dependence on the intensity $I_p$ using the parameters stored in the memory unit; g) calculating the distance value by $R_{abs} = R_{raw,cal} - \Delta(I_p)$.

With the distance camera according to the invention and the method according to the invention the distance values $R_{abs}$ can advantageously be determined with a high precision. Distance images can be taken by either scanning the single photo element over the object and determining the single distance value $R_{abs}$ with the respective light pulse or by providing the camera with multiple photo elements and by determining the multiple distance values $R_{abs}$ with the single light pulse. In case the multiple photo elements are provided smooth distance images can advantageously be taken even if there are variations in individual photo elements present due to manufacturing tolerances since a respective correction value function $\Delta$ is provided for each photo element. Since the interpolation of the sampling points leads to a parameterisation of the correction value function $\Delta$, this function is fully described by its parameters. Therefore, only these parameters need to be stored in the memory unit and the number of accesses to the memory unit is low compared to, for example, storing a high number of sampling points necessary for obtaining a distance measurement with a similar high precision. Due to the fact that the number of accesses to the memory unit according to the invention is low, the correction of the distance values $R_{raw}$ is fast so that even the high precision in a centimeter range can be obtained with a high repetition rate.

Furthermore, all distance values can be corrected by using the parameterised correction value function $\Delta$ and it is not necessary to store correction values $\Delta(I_p)$ for a large number of every conceivable intensity $I_p$.

It is preferred that the memory unit is a non volatile memory. Therefore, a dynamic access to the parameters during the correction of the raw distance values $R_{raw}$ is advantageously provided. Also, it is advantageously assured that an update of the correction value function $\Delta$ can optionally only be provided by the manufacturer of the distance camera by a delivery of the memory unit.

The photo element comprises preferably a condenser and a photo diode accessible from the outside such that the light pulse back reflected from the object is captured by the photo diode and is electrically connected to the condenser such that, when the light pulse back reflected from the object is captured by the photo diode, the condenser is discharged. The signal value U being output at the integration end point in time $T_{1e}$ is therefore preferably the voltage of the condenser at the integration end point in time $T_{1e}$. The voltage is a measure for the energy of the light pulse arriving at the photo diode within the integration gate. It is preferred that the trigger generator comprises a first electrical switch for activating the photo element and a second electrical switch for deactivating the photo element and outputting the signal value U. The first and/or the second electrical switches are preferably transistors, in particular of identical type. By correcting the raw distance value $R_{raw}$ with the correction value $\Delta(I_p)$ it is advantageously achieved that the specific inertia of each individual photo element, in particular the inertia of the photo diode, the condenser and both switches, is corrected.

It is preferred that the distance camera comprises a plurality of photo elements and for every photo element the respective memory unit, wherein the number of the photo elements and the memory units is at least $3*10^5$, in particular at least $10^6$. Since each correction value function $\Delta$ is parameterized and its parameters are stored in the respective memory unit, it is advantageously achieved that the distance values $R_{abs}$ for this high number of photo elements can be determined at a high repetition rate such as 50 Hz.

It is preferred that the predetermined temporal intensity profile of the light pulse is substantially rectangular, trapezoidal, saw tooth shaped, triangular, a Lorentz profile, a Voigt profile or a Gaussian. Further, the temporal intensity profile of the light pulse is preferably predetermined by a measurement. The measurement can for example be carried out by the use of a photo multiplier or a fast photo diode. In case the predetermined temporal intensity profile of the light pulse is not rectangular, the intensity $I_p$ is defined, for example, as maximum intensity of the temporal intensity profile. Other definitions like half maximum of the intensity of the temporal intensity profile are also conceivable. With the predetermined temporal intensity profile, and the determined signal value U and intensity $I_p$, it is possible to determine the distance $R_{raw}$.

Multiple distance values $R_{abs}$ are preferably determined by repeating steps d) to g). Therefore only a single correction value function $\Delta$ has to be determined for the determination of the multiple distance values $R_{abs}$.

It is preferred that the explicit correction value function $\Delta$ is a monotonic function, in particular a polygonal line or a polynomial or a spline. The number of parameters is preferably four. The number of sampling points is preferably four. It has been found that the high precision of the determination of the distance value $R_{abs}$ can advantageously be achieved with this low number of parameters and/or sampling points which results in a high feasible repetition rate.

It is preferred that the intensity sensor is the photo element and the intensity $I_{p,cal}$ and/or the intensity $I_p$ are determined by measuring the signal value $U_{cal}$ and/or U, respectively, the photo element within a second integration gate with an integration start point in time $T_{2b}$ earlier than or equal to $T_o$ and an integration end point in time $T_{2e}$ later than or equal to $T_o+T_p$. Therefore, no extra intensity measuring apparatus needs to be provided for the intensity determination.

BRIEF DESCRIPTION OF THE DRAWINGS

In the following the invention is explained on the basis of schematic drawings.

DETAILED DESCRIPTION

As it can be seen in FIGS. 1 to 4 a distance camera according to the invention for determining a distance value $R_{abs}$ between an object and the distance camera within a predetermined distance range comprises a light source for illuminating the object with light pulses having a substantially rectangular temporal intensity profile with a duration $T_p$. Conceivable are also other temporal profiles. The light source is preferably a light emitting diode or a laser preferably emitting the light pulses with the duration $T_p$ in the nanosecond range. The predetermined distance range is the range in which the distance camera can determine distance values, for example from 0.5 m to 10 m. The distance camera further comprises at least one photo element 9 and a trigger generator for activating the photo element 9 during a temporal integration gate 30, 31 and preferably for controlling the emission of the light pulses with the light source. The trigger generator comprises a first electrical switch 15 for activating the photo element 9 and a second electrical switch 16 for deactivating the photo element 9.

Figure 3:
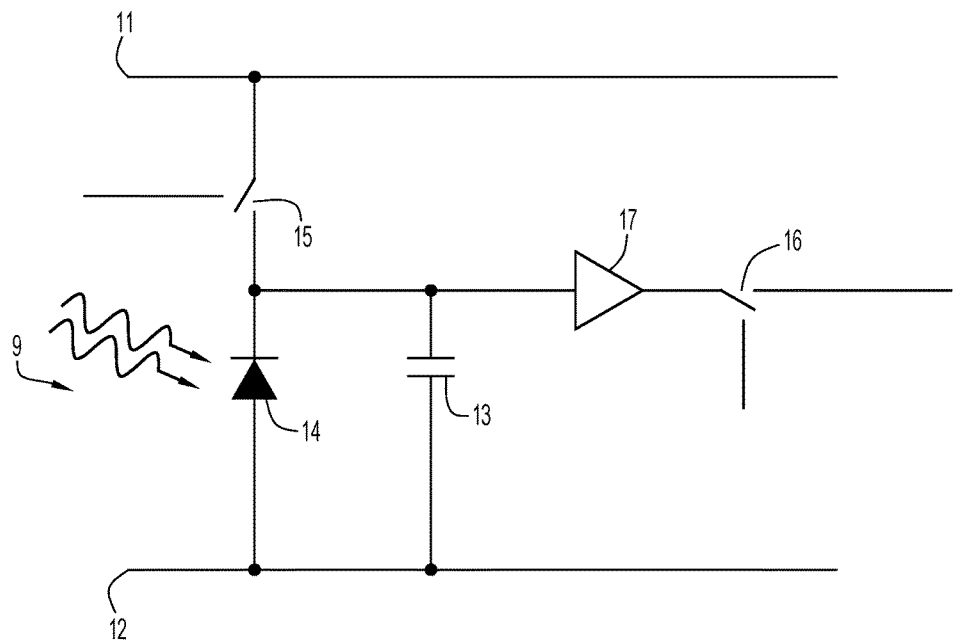
FIG. 3 shows a schematic electrical diagram of a photo element.
Figure 4:
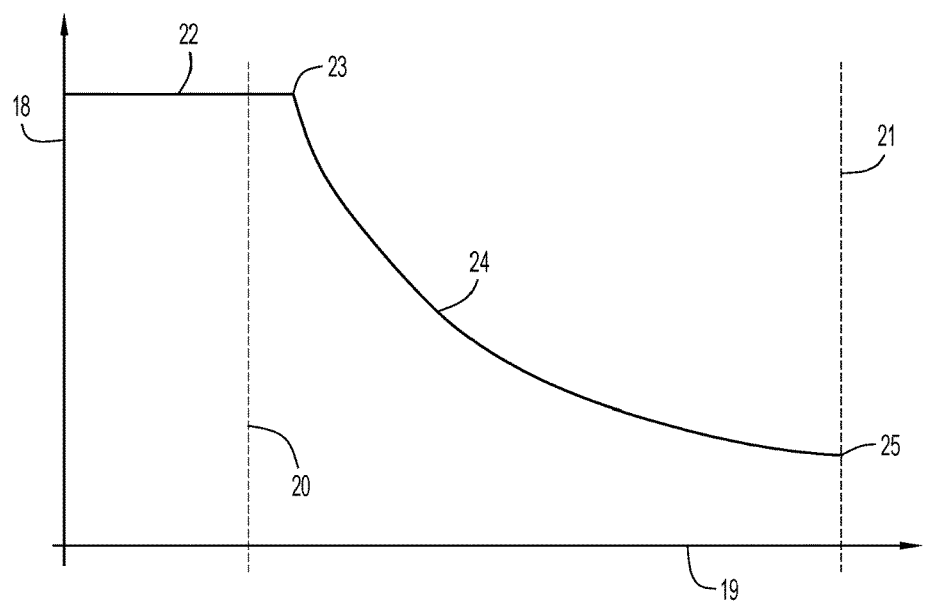
FIG. 4 shows a diagram of a condenser voltage in dependence on time.

FIG. 3 shows that the photo element 9 comprises a condenser 13 and a photo diode 14 accessible from the outside such that the light pulses back reflected from the object are captured by the photo diode 14. The photo diode 14 is electrically connected to the condenser 13 in a parallel circuit such that, when the light pulses back reflected from the object are captured by the photo diode 14, the condenser 13 is discharged. FIG. 4 shows a diagram where the corresponding condenser voltage 18 is plotted versus time 19. The condenser voltage 18 is held at a voltage $V_{DD}$ 22 by a power supply 11 and a corresponding electrical grounding 12 as long as the first electrical switch 15 is closed. At the integration start point in time $T_{1b}$ 20 of the integration gate 30, 31 the trigger generator opens its first electrical switch 15 and after a time delay 23 the condenser voltage 18 begins to drop which results in a voltage decay 24. The time delay 23 can vary between different photo elements 9 due to manufacturing tolerances and can depend on the intensity $I_p$ of the light pulse arriving on the photo element 9. At the integration end point in time $T_{1e}$ 21 of the integration gate 30, 31 the trigger generator closes its second electrical switch 16, whereby a signal value U 25 being the condenser voltage 18 at $T_{1e}$ 21 is output by action of a voltage buffer 17 of the photo element 9. The signal value U 25 is a measure of the energy of the light arriving on the photo element 9 during its activation, wherein the signal value U 25 is approximately inversely proportional to the energy. After closing and opening the first 15 and second 16 electrical switch, respectively, the photo element 9 is reset and another measurement can be taken.

Figure 2:
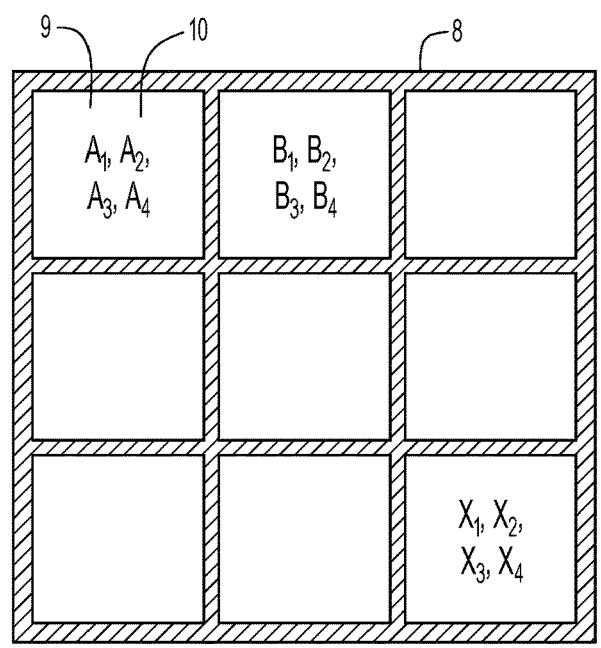
FIG. 2 shows an array with multiple photo elements.

The distance camera further comprises an intensity sensor for determining the intensity $I_p$ of the light pulses arriving on the photo element 9 and an evaluation unit for determining a raw distance value $R_{raw}$ from the signal value U 25 and the intensity $I_p$ 6. The evaluation unit is further adapted to add a correction value $\Delta(I_p)$ 7 taken from a correction value function $\Delta=f(I_p)$ 5 to the raw distance value $R_{raw}$ so as to obtain a distance value $R_{abs}$. Each photo element 9 comprises a memory unit, wherein the parameters 10 of the correction value function $\Delta$ 5 for each photo element 9 are stored in the corresponding memory unit. Each memory unit is corresponding to its photo element 9, wherein each memory unit can be located on a chip of the photo element 9 or externally to the chip. All memory units form a memory of the distance camera. FIG. 2 shows an array 8 of the photo elements 9, wherein the number of the photo elements 9 and the memory units is at least $3*10^5$, in particular at least $10^6$.

Figure 1:
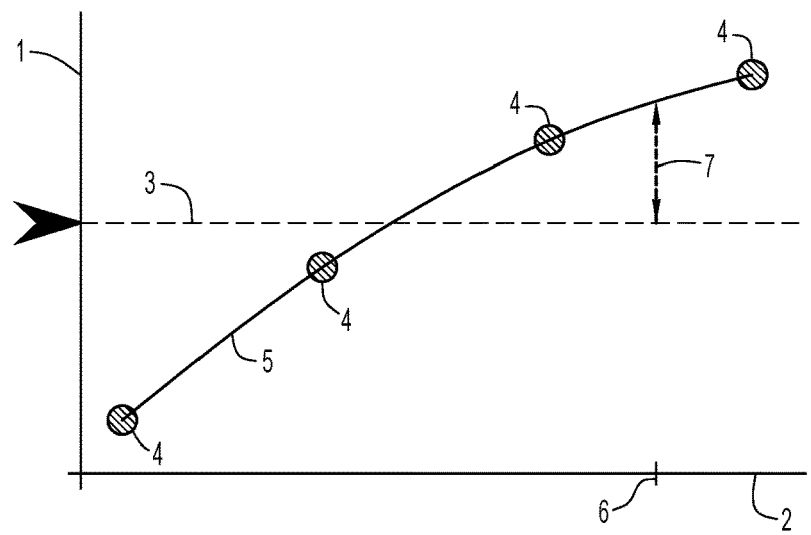
FIG. 1 shows a diagram with an exemplary correction value function $\Delta$.

FIG. 1 shows an exemplary correction value function $\Delta$ 5 in a diagram, in which raw distance values $R_{raw,cal}$ 1 are plotted versus intensity $I_{p,cal}$ 2. The correction value function $\Delta$ 5 is based on four sampling points 4 $R_{raw,cal}$, $I_{p,cal}$, wherein the four sampling points 4 $R_{raw,cal}$ are obtained under known laboratory conditions. For obtaining the sampling points 4 a target object is arranged within the predetermined distance range with a predetermined distance $R_{abs,cal}$ 3 to the distance camera. It has been found that by choosing the predetermined distance $R_{abs,cal}$ to be 2 m and the predetermined distance range to extend from 0.5 m to 10 m results in a particularly high precision for the distance values $R_{abs}$.

The target object is then illuminated by the light source with variable and predetermined intensities $I_{p,cal}$ 2 of the light pulses arriving on the photo element 9, and the respective raw distance values $R_{raw,cal}$ 1 are determined from the respective signal values $U_{cal}$ and the corresponding intensities $I_{p,cal}$ 2. The intensities $I_{p,cal}$ 2 are preferably chosen such that most of the dynamic range of the photo element 9 is covered. The intensity $I_{p,cal}$ 2 can, for example, be varied by inserting grey filters or an optical attenuator comprising a polarisation filter and a lambda half plate in the path of the light pulse. Each pair of a raw distance value $R_{raw,cal}$ 1 and an intensity $I_{p,cal}$ 2 forms the respective sampling point 4.

In order to predetermine the intensities $I_{p,cal}$ 2 of the light pulses arriving on the photo element 9 it is conceivable to adjust the emission intensity of the light source by taking into consideration the reflectance of the target object and the transmission of atmosphere under the laboratory conditions. The emission intensity of the light source is adjusted such that the intensities $I_{p,cal}$ 2 of the light pulses arriving on the photo element 9 correspond to the predetermined intensities $I_{p,cal}$ 2.

The parameters 10 of the explicit correction value function $\Delta=R_{raw,cal}-R_{abs,cal}=f(I_{p,cal})$ 5 are an interpolation of the sampling points 4 $R_{raw,cal}$, $I_{p,cal}$ and are calculated and stored for the photo element 9 in its corresponding memory unit. The interpolation can also comprise sections that are extrapolated from the sampling points 4 $R_{raw,cal}$, $I_{p,cal}$. In FIG. 1 the correction value function $\Delta$ 5 is a third order polynomial in the form of $\Delta=A_1+A_2 I_{p,cal}+A_3 I_{p,cal}^2+A_4 I_{p,cal}^3$ with the parameters $A_1$, $A_2$, $A_3$, $A_4$ being the parameters of this correction value function $\Delta$ 5 for the first photo element 9 in FIG. 2. The parameters $A_1$, $A_2$, $A_3$, $A_4$ for the first photo element 9 are stored in its respective memory unit. The parameters $B_1$, $B_2$, $B_3$, $B_4$ for the second photo element 9 are stored in its memory unit, whereas the parameters $X_1$, $X_2$, $X_3$, $X_4$ are stored in the memory unit of the last photo element 9. However, also polynomials with other orders or other functions, such as exponentials or a polygonal line with the individual lines connecting adjacent sampling points 4 can be employed.

For determining the distance value $R_{abs}$ the object is arranged within the predetermined distance range, illuminated by the light source with the light pulse, and the raw distance value $R_{raw}$ is determined from the signal value U 25 and the corresponding intensity $I_p$ 6 determined using the intensity sensor. The correction value $\Delta(I_p)$ 7 for the raw distance value $R_{raw}$ is then determined in dependence on the intensity $I_p$ 6 using the parameters 10 stored in the respective memory unit and the distance value is afterwards calculated by $R_{abs}=R_{raw,cal}-\Delta(I_p)$ for each photo element 9.

Figure 5:
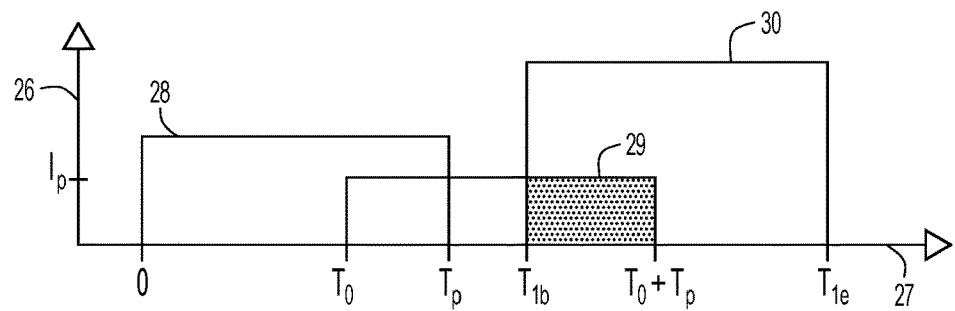
FIGS. 5 to 7 show temporal profile diagrams with light pulses and different integration gates.
Figure 6:
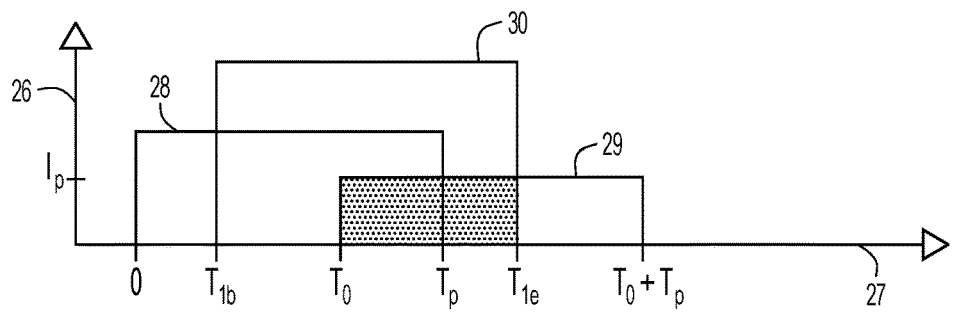
Figure 7:
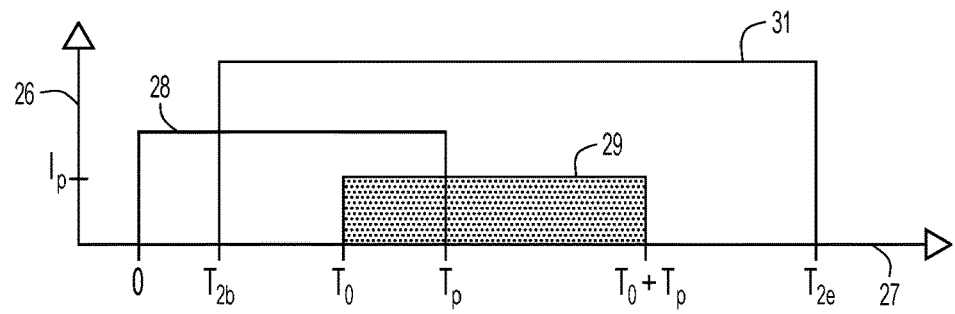

FIGS. 5 to 7 show three trigger schemes, wherein the intensity 26 of the emitted light pulse 28 and of the light pulse 29 arriving on the photo element 9 is plotted versus time 27. Also shown are different integration gates 30, 31 with a predetermined delay to the light pulse emission start point in time. The temporal profiles of the light pulses and integration gates 30, 31 are rectangular. Conceivable are also other temporal profiles for the light pulses. For all conceivable temporal intensity profile shapes, the emission of the light pulse 28 starts at time zero and ends at $T_p$. The light pulse 29 is then back reflected from the object and arrives on the photo element 9 with the intensity $I_p$, which is lower than the intensity of the emitted light pulse 28. The light pulse 29 arrives on the photo element 9 from $T_o$ to $T_o+T_p$. In FIG. 5 the integration gate 30 is chosen such that $T_o+T_p$ is between the integration start point in time $T_{1b}$ 20 and the integration end point in time $T_{1e}$, whereas $T_o$ is outside of the integration gate. In contrast thereto, in FIG. 6 $T_o$ is between the integration start point in time $T_{1b}$ 20 and the integration end point in time $T_{1e}$, whereas $T_o+T_p$ is outside of the integration gate. The grey marked areas in the diagrams correspond to the signal value U being a measure for the energy of the light pulse 29 arriving on the photo element 9 within the integration gates 30, 31.

The intensity $I_{p,cal}$ and/or the intensity $I_p$ are determined by measuring the signal value $U_{cal}$ and/or U, respectively, using the photo element within a second integration gate 31, as shown in FIG. 7, with an integration start point in time $T_{2b}$ earlier than or equal to $T_o$ and an integration end point in time $T_{2e}$ later than or equal to $T_o+T_p$. With the signal values $U_{cal}$ and/or U, which correspond to the total energy of the light pulse 29 arriving on the photo element 9 and the known duration $T_p$ of the light pulse 29, it is possible to calculate the intensity $I_p$.

The intensity $I_p$ and/or $I_{p,cal}$ can be determined simultaneously with a single light pulse by using two photo elements 9, the first photo element with the first integration gate 30 and the second photo element with the second integration gate 31. The first integration gate 30 is chosen such that either $T_o$ or $T_o+T_p$ is between the first integration start point in time $T_{1b}$ of the first integration gate 30 and the first integration end point in time $T_{1e}$ of the integration gate 30. The second integration gate 31 is chosen such that the second integration start point in time $T_{2b}$ is earlier than or equal to $T_o$ and the second integration end point in time $T_{2e}$ is later than or equal to $T_o+T_p$. The first and the second photo elements can for example be arranged adjacent to each other or the light pulse 29 can be split with a beam splitter and each split light pulse can be directed to the first and second photo elements, respectively. The intensity $I_p$ and/or $I_{p,cal}$ can also be determined consecutively with a single photo element 9 and two light pulses 29.

With the integration gate 30 according to FIG. 5, $T_o$ can be calculated by $T_o = E/I_p + T_{1b} - T_p$ and with the integration gate 30 according to FIG. 6 by $T_o = T_{1e} - E/I_p$ with E being the energy of light pulse 29 arriving on the photo element 9 and being preferably reciprocal to the signal value U 25. $R_{raw}$ can then be determined via $R_{raw} = 0.5 * c * T_o$, with c being the speed of light. It should be noted that it is possible to either correct $R_{raw}$ or $T_o$ with $\Delta(I_p)$. It should be noted also that a change of the light source of the camera or a change in $T_{1b}$ and $T_{1e}$ required by a change in the predetermined distance range usually requires a new calibration function $\Delta$.

LIST OF REFERENCE SIGNS

1 raw distance values $R_{raw,cal}$
2 intensity $I_{p,cal}$
3 predetermined distance $R_{abs,cal}$
4 sampling point
5 correction value function $\Delta$
6 intensity $I_p$
7 correction value $\Delta(I_p)$
8 array
9 photo element with memory unit
10 parameters
11 power supply
12 electrical grounding
13 condenser
14 photo diode
15 first electrical switch
16 second electrical switch
17 voltage buffer
18 condenser voltage
19 time
20 integration start point in time $T_{1b}$
21 integration end point in time $T_{1e}$
22 voltage $V_{DD}$
23 time delay
24 voltage decay
25 signal value U
26 intensity
27 time
28 emitted light pulse
29 light pulse arriving on the photo element
30 integration gate
31 second integration gate

What is claimed is:

1. A device for determining a distance value ($R_{abs}$) between an object and the device within a distance range, comprising:
   at least one photo element,
   a trigger generator for activating the photo element during a temporal integration gate,
   a light source for illuminating the object with light pulses having a temporal intensity profile with a duration ($T_p$),
   an intensity sensor for determining an intensity ($I_p$) of the light pulses arriving on the photo element, wherein the integration gate has a predetermined delay to the light pulse emission start point in time in order to capture the light pulses back reflected from the object, wherein the photo element is adapted to output a signal value (U) at the integration end point in time $T_{1e}$ with the signal value U depending on the intensity $I_p$ and the duration of the light pulse arriving on the photo element during the time the photo element is activated,
   a memory unit for storing predetermined parameters related to explicit light-pulse-intensity dependent correction value function $\Delta = f(I_p)$ for the photo element, and
   an evaluation unit for determining a raw distance value ($R_{raw}$) from the signal value U and the light-pulse-intensity $I_p$ and combining the raw distance value $R_{raw}$ and a correction value $\Delta(I_p)$ taken from the light-pulse-intensity-dependent correction value function $\Delta = f(I_p)$ for obtaining the distance value $R_{abs}$.

2. The device according to claim 1, wherein the memory unit is a non-volatile memory and parameters of a correction value function for each photo element are stored in an additional memory unit.

3. The device according to claim 1, wherein the photo element comprises a condenser and a photo diode accessible from outside the device such that the light pulse back reflected from the object is captured by the photo diode and electrically connected to the condenser such that, when the light pulse back reflected from the object is captured by the photo diode, the condenser is discharged.

4. The device according to claim 1, wherein the trigger generator comprises a first electrical switch for activating the photo element and a second electrical switch for deactivating the photo element and outputting the signal value U.

5. The device according to claim 1, further comprising a plurality of additional photo elements and a plurality of additional memory units associated respectively with the additional photo elements.

6. The device according to claim 5, having a number of photo elements and memory units.

7. The device according to claim 1, wherein the predetermined temporal intensity profile of the light pulse is rectangular, trapezoidal, saw tooth shaped, triangular, a Voigt profile or a Gaussian.

8. The device according to claim 1, wherein the temporal intensity profile of the light pulse is predetermined by a measurement.

9. A method for determining a distance value ($R_{abs}$) between an object and a device according to claim 1, comprising:
   a) arranging a target object a distance from the device,
   b) obtaining a plurality of sampling points ($R_{raw,cal}$, $I_{p,cal}$),
   c) calculating the parameters of the explicit light-pulse-intensity-dependent correction value as an interpolation of the sampling points $R_{raw,cal}$, $I_{p,cal}$, and storing the parameters for the photo element in the memory unit,
   d) arranging the object within the distance range,
   e) illuminating the object with the light pulses, and determining the raw distance value $R_{raw}$ from the signal value U and the corresponding intensity $I_p$ determined by the intensity sensor,
   f) calculating the correction value $\Delta(I_p)$ for the raw distance value $R_{raw}$ in dependence on the intensity $I_p$ with the parameters stored in the memory unit, and
   g) calculating the distance value $R_{abs}$.

10. The method according to claim 9, further comprising repeating the limitations (d) through (g) for determining multiple distance values $R_{abs}$.

11. The method according to claim 9, wherein the explicit correction value function $\Delta$ is a monotonic function.

12. The method according to claim 11, wherein the monotonic function is a polygonal line or a polynomial or a spline.

13. The method according to claim 9, wherein the number of parameters is at least four.

14. The method according to claim 9, wherein the number of sampling points is at least four.

15. The method according to claim 9, wherein the intensity sensor is the photo element and the determined intensities $I_{p,cal}$ and/or the intensity $I_p$ are determined by measuring the signal value $U_{cal}$ and/or U, respectively, with the photo element within a second integration gate with a further integration start point in time ($T_{2b}$) earlier than or equal to $T_o$ and a second integration end point in time ($T_{2e}$) later than or equal to $T_o+T_p$.

* * * * *